(12) United States Patent
Sturm

(10) Patent No.: US 8,192,116 B2
(45) Date of Patent: Jun. 5, 2012

(54) LATHE-MOUNTED TOOL-HOLDER

(75) Inventor: Norman Keith Sturm, The Woodlands, TX (US)

(73) Assignee: KVK Industries, LLC, Conroe, TX (US)

( * ) Notice: Subject to any disclaimer, the term of this patent is extended or adjusted under 35 U.S.C. 154(b) by 561 days.

(21) Appl. No.: 12/476,022

(22) Filed: Jun. 1, 2009

(65) Prior Publication Data

US 2010/0303572 A1    Dec. 2, 2010

(51) Int. Cl.
*B23B 31/11* (2006.01)

(52) U.S. Cl. ............ 409/234; 409/232; 82/158; 407/99; 279/8; 279/143

(58) Field of Classification Search .......... 409/231–234; 279/8, 20, 143–145; 82/157–159; 407/99, 407/102; 408/56, 57, 238, 239 R, 239 A
See application file for complete search history.

(56) References Cited

U.S. PATENT DOCUMENTS

| | | | | |
|---|---|---|---|---|
| 2,374,919 | A * | 5/1945 | Bruseth | 409/233 |
| 2,501,421 | A * | 3/1950 | Stephan | 279/155 |
| 3,015,241 | A * | 1/1962 | Konwal | 408/199 |
| 3,115,065 | A | 12/1963 | Kulusic | |
| 3,374,711 | A * | 3/1968 | Saunders | 409/233 |
| 3,676,120 | A * | 7/1972 | Nelson et al. | 409/233 |
| 3,691,883 | A | 9/1972 | Ingram | |
| 3,884,120 | A | 5/1975 | Diferdinando | |
| 4,062,552 | A | 12/1977 | Kitaguchi | |
| 4,308,771 | A * | 1/1982 | Windle | 82/158 |
| 4,436,463 | A | 3/1984 | Rea | |
| 4,604,010 | A | 8/1986 | Reeves | |
| 4,934,883 | A * | 6/1990 | Andersson et al. | 409/234 |
| 4,945,793 | A * | 8/1990 | von Haas | 82/161 |
| 5,311,654 | A | 5/1994 | Cook | |
| 5,368,421 | A | 11/1994 | Head | |
| 5,372,465 | A | 12/1994 | Smith | |
| 6,769,846 | B2 | 8/2004 | Campbell, Jr. et al. | |
| 6,789,299 | B1 | 9/2004 | Kidder | |
| 6,964,547 | B2 | 11/2005 | Stojanovski | |
| 7,186,064 | B1 | 3/2007 | Erickson et al. | |
| 7,252,467 | B2 | 8/2007 | Miller | |
| 7,338,420 | B2 | 3/2008 | Imahata | |
| 7,527,459 | B2 * | 5/2009 | Stojanovski | 409/234 |
| 2002/0035902 | A1 * | 3/2002 | Ericksson et al. | 82/158 |

FOREIGN PATENT DOCUMENTS

| | | | | |
|---|---|---|---|---|
| CZ | 278881 | B6 * | 7/1994 | |
| DE | 4340911 | A1 * | 6/1994 | |
| EP | 15248 | A * | 9/1980 | |
| GB | 2158374 | A * | 11/1985 | |
| JP | 06170615 | A * | 6/1994 | |
| JP | 2000233312 | A * | 8/2000 | |

* cited by examiner

*Primary Examiner* — Daniel Howell
(74) *Attorney, Agent, or Firm* — James E. Hudson, III; Crain, Caton & James, P.C.

(57) ABSTRACT

An adaptive device for use as a tool holder for manual and computer numerical controlled lathes is provided to retain and use tools of various sizes, including those intended for use on CNC lathes and on mills. The device includes a sleeve, which includes an inner-tapered surface, a neck and an opening, and a threaded member sized to fit through the neck in the opening. The adaptive device may further include one or more shoulders and/or grooves on the exterior of the sleeve, and/or a retaining member fitted to the threaded section, and may include an embodiment where the sleeve is integrated into a tool holder and/or where the threaded member is constructed to permit fluid flow into the tool holder.

5 Claims, 6 Drawing Sheets

LATHE-MOUNTED TOOL-HOLDER

CROSS REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of Invention

The present invention relates to a tool holder for use on manual and computer numerical controlled lathes, and particularly for a universal tool holder to retain and use in a lathe, and to use on lathes milling holders of various sizes intended for use on CNC mills.

2. Description of the Related Art

Lathe tooling currently available requires time to be expended in changing from one size tool or drill to another. In particular, lathe tooling requires a particular bushing for each size tool or drill, thus requiring a number of different size bushings and added cost to fulfill manufacturing needs. Even with the correct bushing size, installation can still be time-consuming and potentially improper. Currently tooling is locked in place with side-mounted set screws, which is prone to tilting the cutting edge off its true center-line. Thus, maintaining true centerline during assembly can be problematic and time consuming. Compounding this problem, the tolerances between multiple components can cause deflection of the cutting edge during assembly, causing excessive tool wear and tolerance issue. Additionally, when a small hole or inner diameter is to be machined within a cavity, the available tool or drill may be short, requiring either a longer tool or use of the existing tool beyond the manufacturer's specification, causing excessive tool wear and creating tolerance issues. These problems are exacerbated by the use of at least two standard milling holders, generally referred to a CAT and BT style milling holders, and by the variety of milling holders, differing in characteristics such as size and length.

Additionally, machine shops typically utilize mills and lathes, which each may utilize its own tooling. Often the tooling for a milling machine cannot be easily used on the lathe. This can easily result in a large number of tooling pieces, a number which could be reduced if some of the milling tools could be used on the lathe.

The need therefore exists for an adapter which can be mounted on a lathe, which permits quick exchange of tools, and which ensures the centerline of the tool during installation. Additionally, there exists a need to provide an adapter that can be mounted on a lathe that accepts a variety of sizes of tools, including tools intended for use on mills and on lathes, regardless of the style of milling holder.

BRIEF SUMMARY OF THE INVENTION

The present invention overcomes the foregoing drawbacks.

The present invention provides an adapter to be mounted on a lathe that permits use of both CNC lathe tools and CNC mill tools to be used on lathe applications, reducing the cost and the need for purchase of numerous bushings of various sizes.

In operation, after removal of the milling holder retention knob from the milling tool, the milling holder is positioned within an adapter sleeve and retained in place with a locking screw of the adapter sleeve. The adapter sleeve is then inserted into a standard lathe holder and the set screws of the lathe holder positioned against the exterior of the adapter sleeve. The milling holder is thus positioned for use.

The foregoing and other objectives, features, and advantages of the invention will be more readily understood upon consideration of the following detailed description of the invention, taken in conjunction with the accompanying drawings.

BRIEF DESCRIPTION OF THE SEVERAL DRAWINGS

So that the manner in which the described features, advantages and objects of the invention, as well as others which will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

DETAILED DESCRIPTION OF THE INVENTION

The invention may be further understood by the following non-limiting examples. Although the description herein contains many specificities, these should not be construed as limiting the scope of the invention but as merely providing illustrations of some of the presently preferred embodiments of the invention. For example, thus the scope of the invention should be determined by the appended claims and their equivalents, rather than by the examples given. In general the terms and phrases used herein have their art-recognized meaning, which can be found by reference to standard texts, journal references and contexts known to those skilled in the art. The following definitions are provided to clarify their specific use in the context of the invention. All references cited herein are hereby incorporated by reference to the extent not inconsistent with the disclosure herewith.

Figure 1:
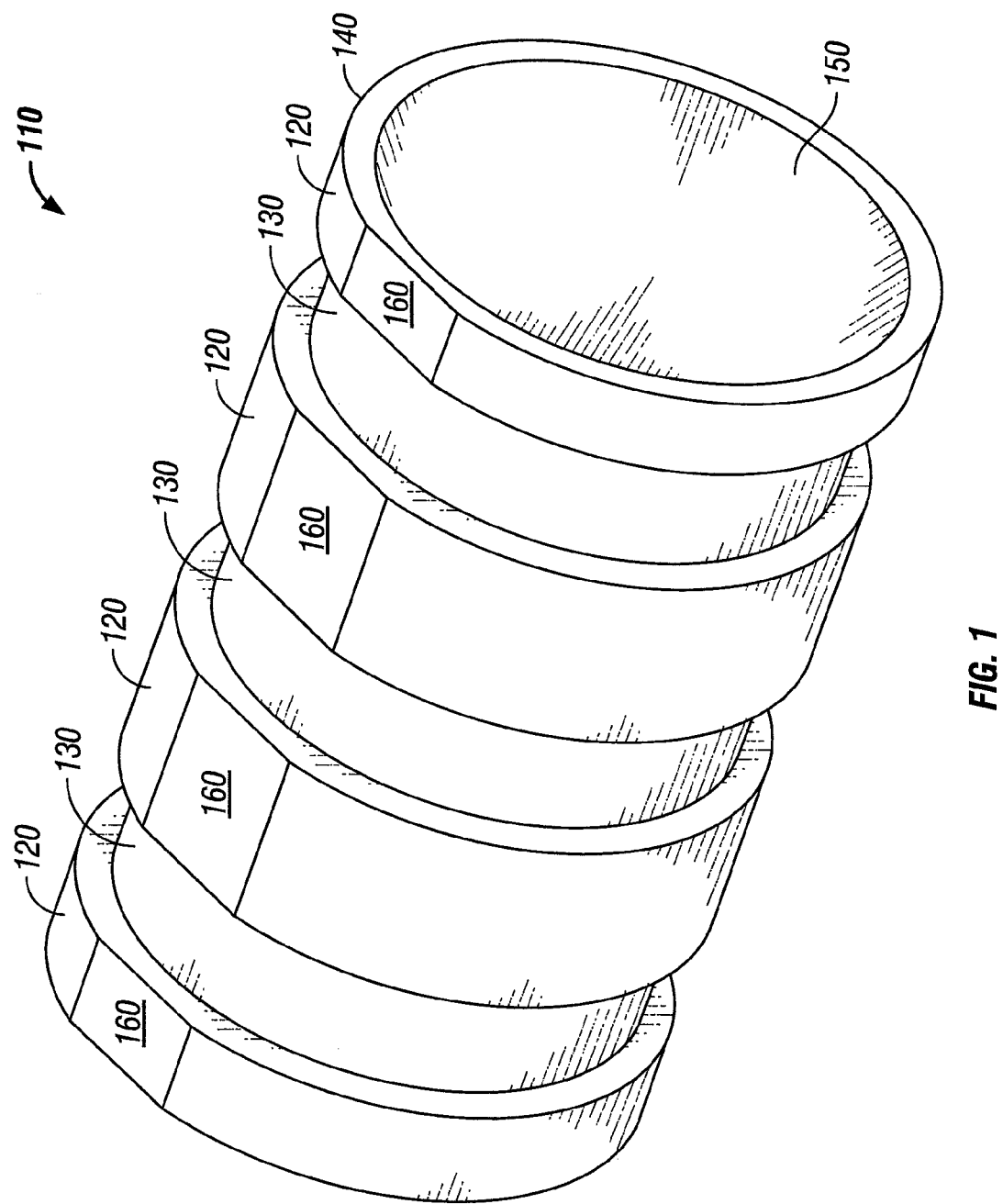
FIG. 1 illustrates the sleeve portion of the adaptive device.

Referring to FIG. 1, the adaptive device 100 includes a sleeve 110, preferably externally cylindrical, which may include one or more shoulders 120 and one or more grooves 130 on the exterior of the sleeve and radially encircling the sleeve 110, and which has an outer edge 140 adjacent its end opening 150. A portion of one or more of the shoulders 120 may be milled to provide a flat surface 160. When present, the flat surface 160 of the shoulder 120 presents a surface for the set screws 370 in the lathe holder 310 (depicted in FIG. 3) to press against and thus retain the adaptive device 100 in position in a lathe holder 310 (depicted in FIG. 3). Alternatively, when present, the grooves 130 provide a track into which the set screws 370 in the tool holder 310 (depicted in FIG. 3) can penetrate, thus fixing or locking the sleeve 110 in relative position but permitting the sleeve 110 to rotate. Examples of typical milling holders include Techniks 22255 CAT40xER 32-4" with a capacity range of 0.040"-0.787" and SECO E4041 5875 4075 with a capacity 0.118"-1.02".

Figure 2:
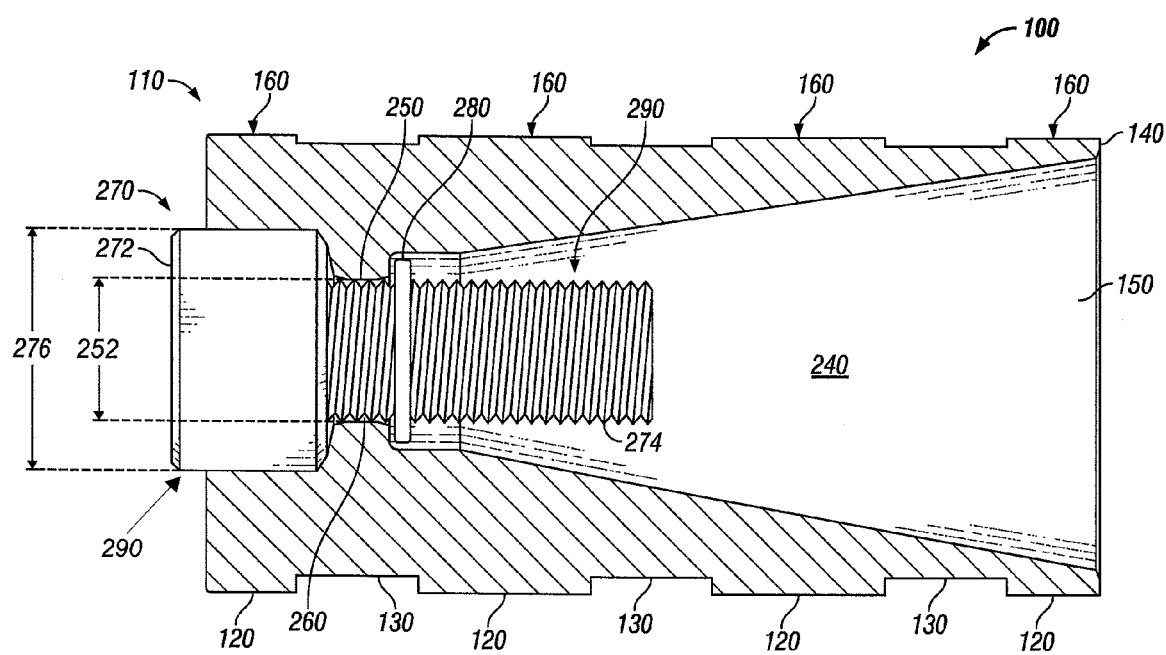
FIG. 2 illustrates a cut-away view of the sleeve portion of the adaptive device together with the locking mechanism.

Referring to FIG. 2, sleeve 110 also includes a conically-tapered inner surface 240, terminating adjacent a neck 250 and an opening 260.

Still referring to FIG. 2, the adaptive device 100 also includes a threaded member 270, which includes a head 272 and a threaded section 274. The threaded section 274 of the threaded member 270 is fitted to pass through the neck 250 of the sleeve 110. The head 272 of the threaded member 270 has an outer diameter 276 sufficiently larger than the inner diameter 252 of the neck 250 of the sleeve 110 that the neck 250 provides a seating surface for the threaded member 270. The adaptive device 100 may further include a retaining ring 280. When present, a groove may be included on the threaded member 270 at a location just beyond the neck 250 to provide a seat for the retaining ring 280, thus fixing the threaded member 270 in a position relative to the neck 250. Alternatively any other retention system may be utilized to maintain the threaded member 270 in position. For example, a threaded washer, thick enough to provide a rigid bearing surface, preferably ¼ inch (0.635 cm), may be formed to screw onto the threaded section 274 of threaded member 270, screwed onto the threaded section 274 of threaded member 270 and then distorted at its front to lock onto the threaded section 274, thus working like a lock nut rather than a snap ring.

Figure 3:
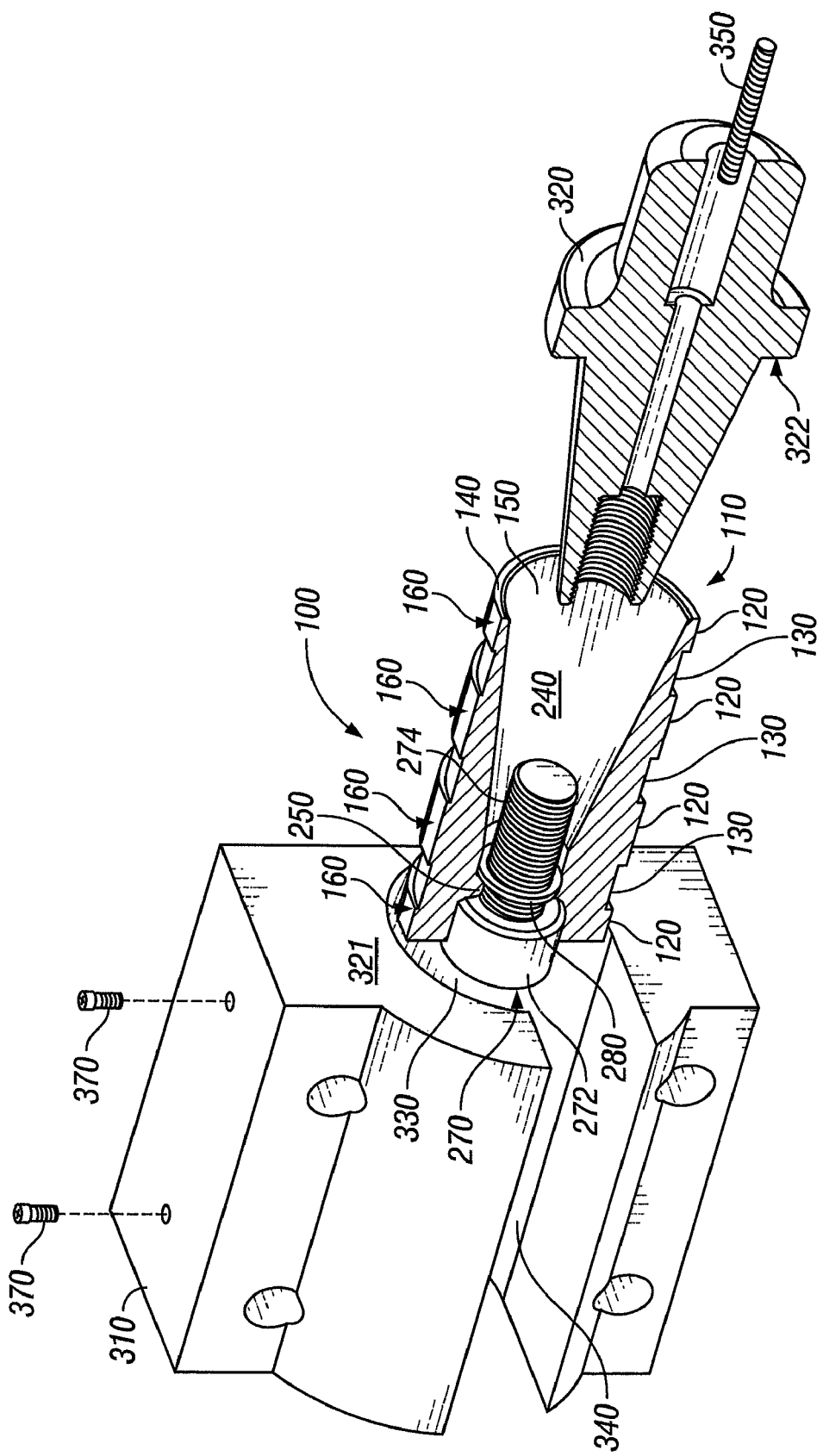
FIG. 3 illustrates a partial cut-away isometric view of the adaptive device.
Figure 6:
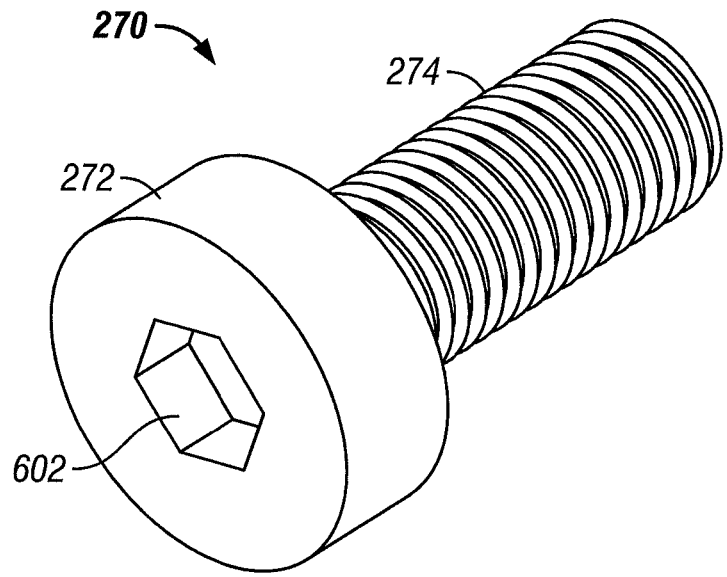
FIG. 6 illustrates one embodiment of the head of the threaded member, which permits rotation.
Figure 7:
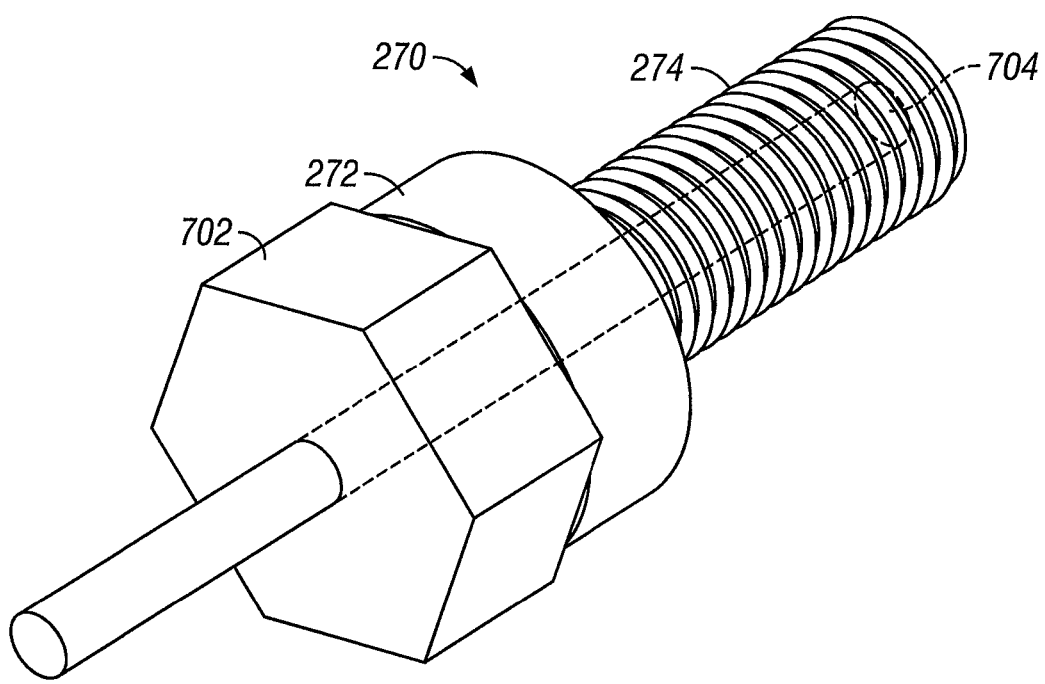
FIG. 7 illustrates one embodiment of the threaded member with a passage therefore for fluid introduction.

Referring to FIG. 3, thus when the threaded member 270 is rotated into or out of the milling holder 320, the threaded member 270 remains in position relative to the adapter sleeve 110, either drawing milling holder 320 further into adapter sleeve 110 or permitting its rapid removal depending on the direction of rotation of threaded member 270. Rotation of the threaded member 270 is accomplished by rotating the head 272 of the threaded member 270, which can be made possible by any interface, such as a hex, spline, Phillips or straight female section 602 on head 272, as depicted in FIG. 6. Referring to FIG. 7, head 272 may be fitted with another fitting 702 and threaded member 270 provided with an interior passage 704, permitting both rotation and for connection with a fluid source to permit fluid to pass through threaded member 270, to the milling holder 320 and ultimately to the tool 350.

Referring to FIG. 3, once assembled, using a threaded member 270 for either a CAT-style (English) or BT-style (metric) milling holder, a milling holder 320, with its retention knob removed, may be inserted into the adaptive device 100 along the inner tapered surface 240 until contact with the threaded member 270, at which time the threaded member 270 may be rotated to further draw the milling holder 320 into the sleeve 110 and thus maintain the milling holder 320 in relative position. By virtue of the three points of contact against the milling holder 320, namely the threaded member 270, the tapered surface 240 of the sleeve 110 and the outer face 321 of the standard lathe holder 310, milling holder 320 is maintained on a common centerline, regardless of the milling holder used.

The sleeve 110 of the adaptive device 100, retaining the milling holder 320, may be integrated into a standard lathe holder 310 at the opening 330 sized for insertion of a particular milling holder 320. Beneficially, as adaptive device 100 can be inserted into the standard lathe holder 310 and can retain any number of milling holders 320, the number of milling holders 320 which can be used with any single standard lathe holder 310 is substantially increased. The adaptive device 100 is sized so the shoulders 120 of the adaptive device 100 cleanly fits to the opening 330 of the lathe holder 310. The set screws 370 of the standard lathe holder 310 may then be advanced until either contacting the flat surface 160 or the grooves 130 of the shoulder 120, thus retaining the adaptive device 100 in relative position.

Figure 4:
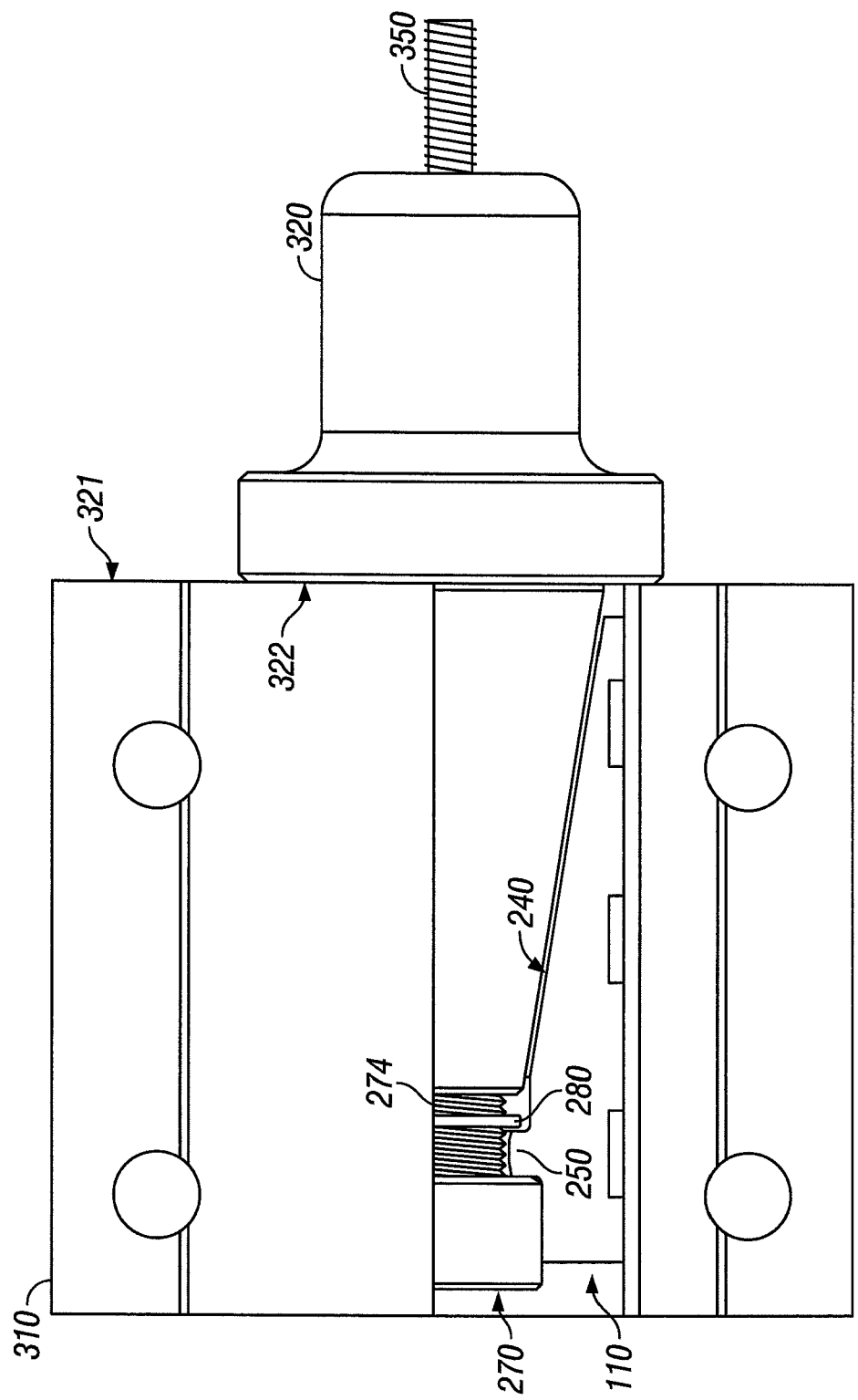
FIG. 4 illustrates a partial cut-away side view of the adaptive device.

Referring to FIG. 4, in operation, the adaptive device 100 may be inserted into a standard lathe holder 310 until the back flange face 322 makes contact with the face 321 of the standard lathe holder 310. The set screws 370 of the lathe holder 310 can then be brought into contact with the adaptive device 100 at either flat surfaces 160 the sleeve 110 or into the grooves 130, preferably three (3) in number, around the outer diameter of adaptive device 100. By locating the taper 240 and the flange face 322 of the milling holder 320, rigidity is increased and a true centerline position is maintained. Once the adaptive device 100 is installed, changing from one tool 350 to another, including from one style of milling holder 320 to another, is accomplished by simply unscrewing the locking mechanism 290, allowing retaining ring 280 to contact the neck face 250, and releasing holder 320 form tapered surface 240. Locking mechanism 290 can include a passage 704, which allows coolant to pass through or around tool 350, for coolant introduction.

Figure 5:
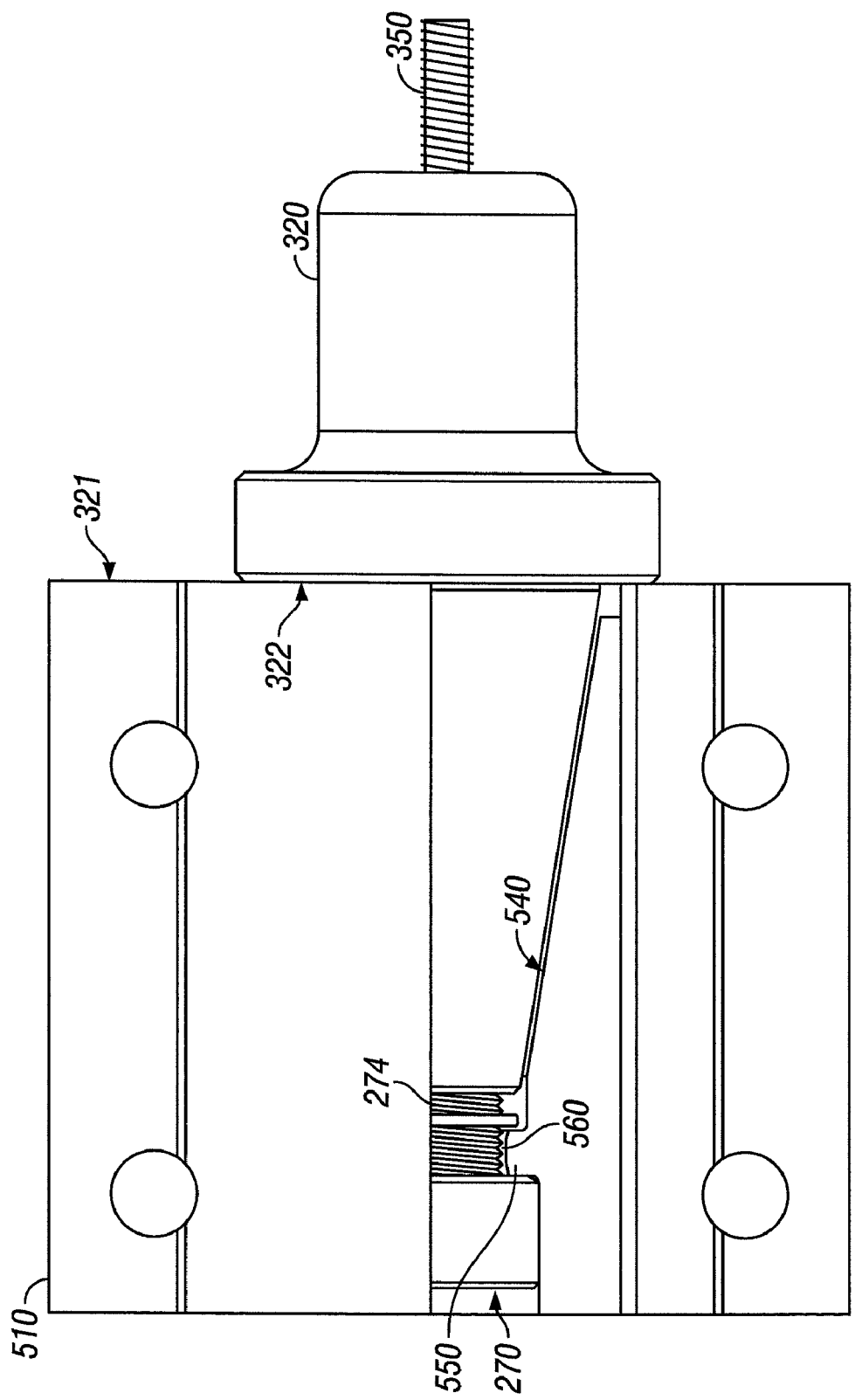
FIG. 5 illustrates a partial cut-away isometric view of an alternative embodiment of the adaptive device.

Referring to FIG. 5, in an alternative embodiment, the sleeve 110 may be integrated into a lathe holder 510, such that the sleeve 110 is no longer a separate member and so the inner-tapered surface 540 is constructed within the lathe holder 510, so that the inner tapered surface 540 terminates adjacent a neck 550 and an opening 560. The adaptive device 100 continues to include a threaded member 270, which includes a head 272 and a threaded section 274, which continues to be fitted to pass the neck 250 of the sleeve 110 and where the head 272 of the threaded member 270 continues to have an outer diameter sufficiently larger than the inner diameter of the neck 550 of the lathe holder 510 to provide a seating surface for the threaded member 270.

The invention can therefore be characterized as a device for retaining milling tool holders with a sleeve 110, which includes an inner-tapered surface 240, a neck 250 and an opening 260, the neck 250 having an inner diameter, and a threaded member 270, the threaded member having a head 272 and a threaded section 274, the threaded section 274 having an outer diameter, the outer diameter of the threaded section 274 equivalent to the inner diameter of the neck 250, the head 272 having an outer diameter, the outer diameter of the head 272 greater than the inner diameter of the threaded section 274. The invention may further include one or more shoulders 120 and/or grooves 130 on sleeve 110, and/or a retaining member 280 fitted to the threaded section 274, and may include an embodiment where the sleeve 110 is integrated into a tool holder 310.

The terms and expressions which have been employed in the foregoing specification are used therein as terms of description and not of limitation, and there is no intention, in the use of such terms and expressions, of excluding equivalents of the features shown and described or portions thereof.

I claim:

1. A device for retaining milling tool holders, comprising:
   a. a sleeve, said sleeve having a passage therethrough, said sleeve including a tapered inner surface, a neck and an opening, said neck having an inner diameter, said sleeve having an exterior, said tapered inner surface, said neck and said opening defining said passage;

b. a threaded member, said threaded member having a head and a threaded section, said threaded section having an outer diameter, said outer diameter of said threaded section equivalent to said inner diameter of said neck, said head having an outer diameter, said outer diameter of said head greater than said outer diameter of said threaded section; and
c. a retaining member constructed to fit about said threaded section of said threaded member in said passage of said sleeve at the opposite side of said neck from said head, said retaining member having an outer diameter greater than said neck inner diameter.

2. The device of claim 1, further comprising:
a shoulder on said exterior of said sleeve radially encircling said sleeve.

3. The device of claim 2, further comprising:
a groove on said exterior of said sleeve radially encircling said sleeve.

4. The device of claim 1, wherein:
said threaded member having a passage therethrough.

5. A device for retaining milling tool holders, comprising:
a. a sleeve, said sleeve having a passage therethrough, said sleeve including a tapered inner surface, a neck and an opening, said neck having an inner diameter, said sleeve formed within a tool holder, said tapered inner surface, said neck and said opening defining said passage; and
b. a threaded member, said threaded member having a head and a threaded section, said threaded section having an outer diameter, said outer diameter of said threaded section equivalent to said inner diameter of said neck, said head having an outer diameter, said outer diameter of said head greater than said outer diameter of said threaded section; and
c. a retaining member constructed to fit about said threaded section of said threaded member in said passage of said sleeve at the opposite side of said neck from said head, said retaining member having an outer diameter greater than said neck inner diameter.

\* \* \* \* \*